F. M. PETERS AND W. H. HUNGERFORD.
SEALING OR LABELING MACHINE.
APPLICATION FILED OCT. 23, 1919.

1,429,095.

Patented Sept. 12, 1922.
4 SHEETS—SHEET 1.

Inventors.
Frank M. Peters,
Warren H. Hungerford,
By Offield, Towle, Graves & Soans Attys.

F. M. PETERS AND W. H. HUNGERFORD.
SEALING OR LABELING MACHINE.
APPLICATION FILED OCT. 23, 1919.
1,429,095.
Patented Sept. 12, 1922.
4 SHEETS—SHEET 2.
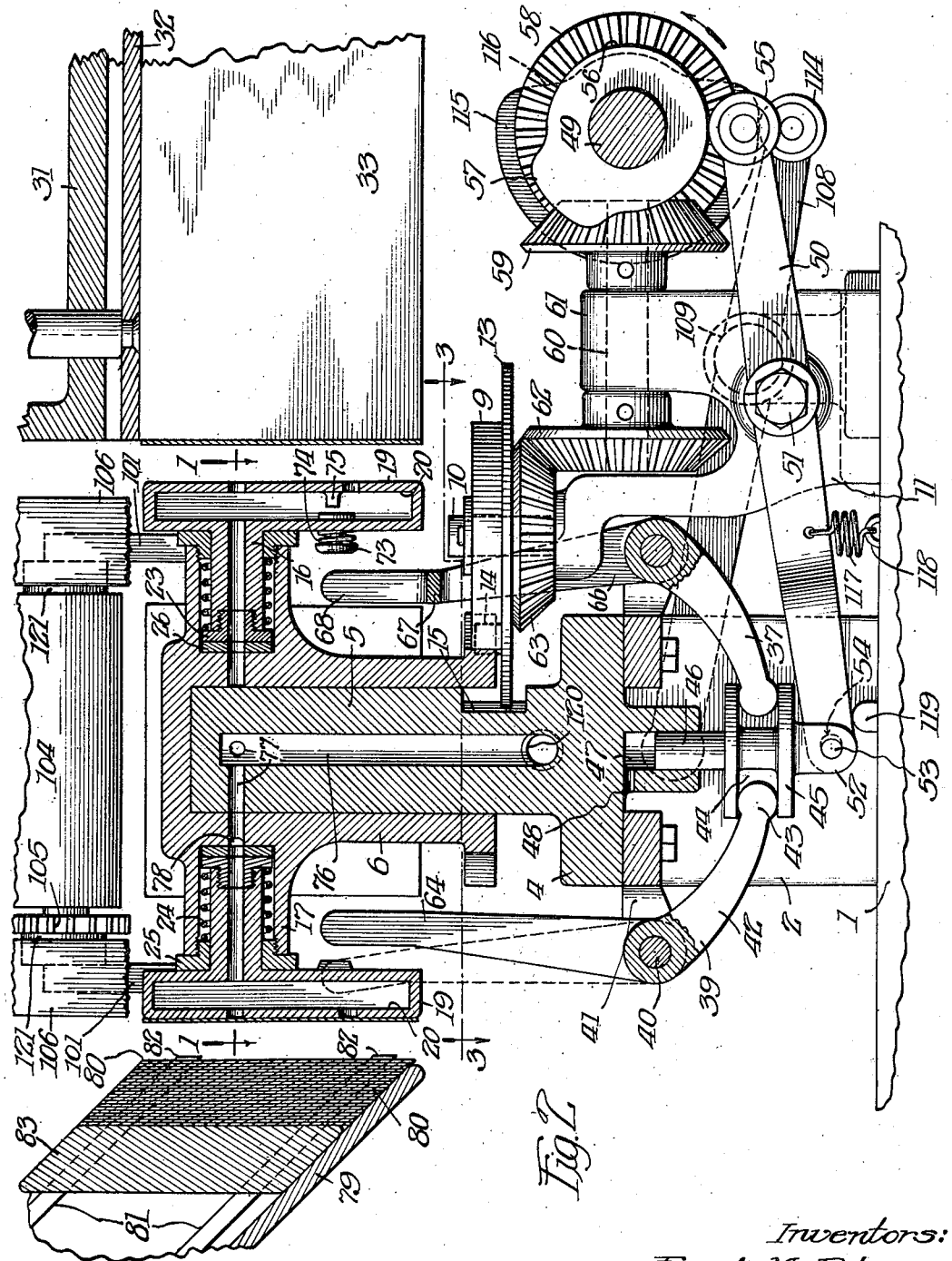
Inventors:
Frank M. Peters,
Warren H. Hungerford,
By Offield, Towle, Graves & Soans attys.

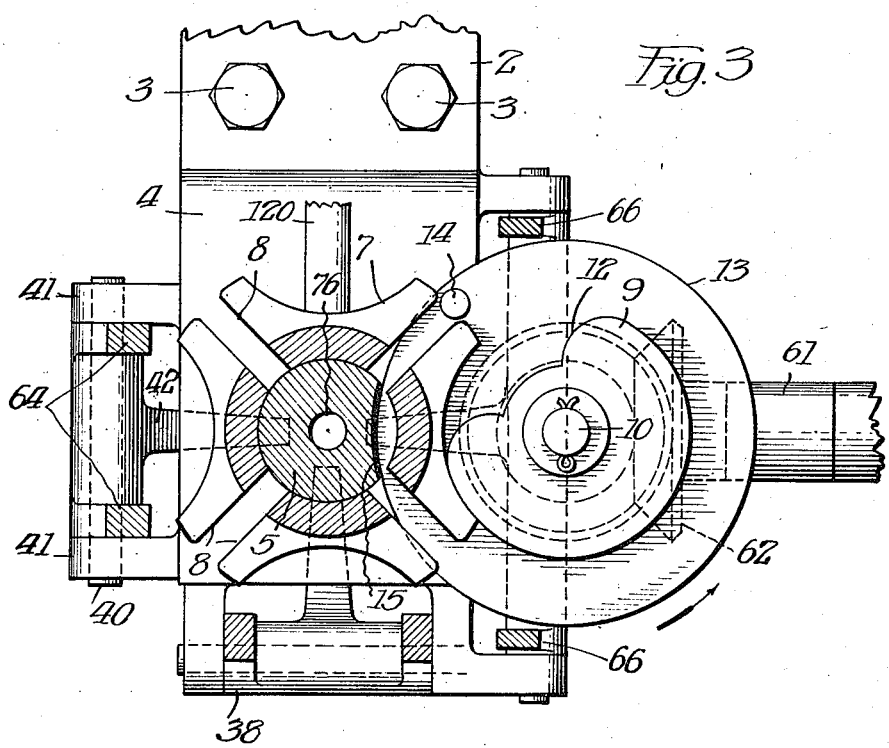

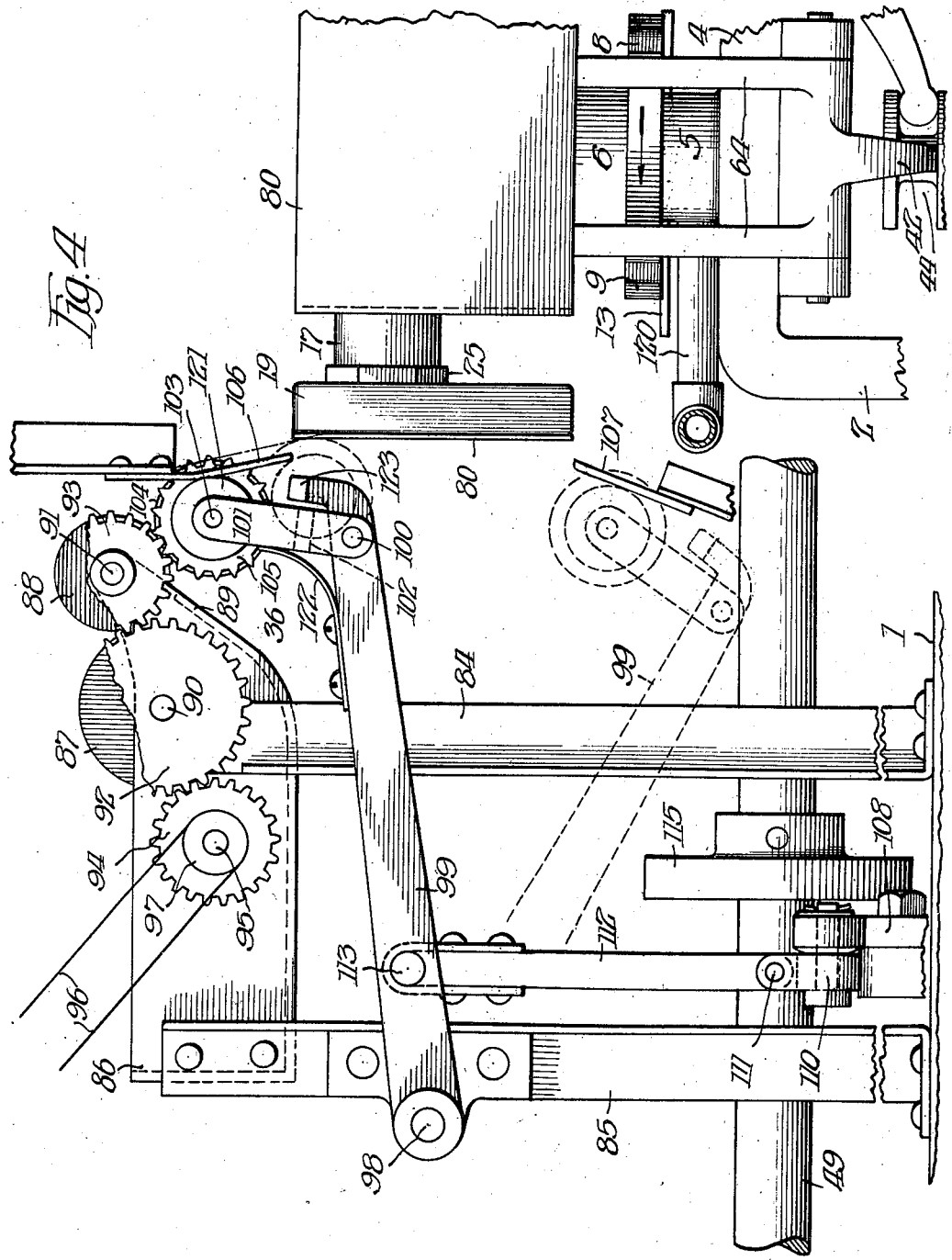

Patented Sept. 12, 1922.

1,429,095

UNITED STATES PATENT OFFICE.

FRANK M. PETERS AND WARREN H. HUNGERFORD, OF CHICAGO, ILLINOIS, ASSIGNORS TO PETERS MACHINERY COMPANY, OF CHICAGO, ILLINOIS, A CORPORATION OF ILLINOIS.

SEALING OR LABELING MACHINE.

Application filed October 23, 1919. Serial No. 332,715.

*To all whom it may concern:*

Be it known that we, FRANK M. PETERS and WARREN H. HUNGERFORD, both citizens of the United States, residing at Chicago, in the county of Cook and State of Illinois, have invented certain new and useful Improvements in Sealing or Labeling Machines, of which the following is a specification.

Our invention has reference more particularly to a machine for sealing packages or affixing labels thereto, wherein a carrier receives a seal or label from a magazine or other source of supply and applies same to a package or other article to be sealed or labeled.

The principal objects of our invention are to provide a sealing or labeling machine, having a revolving carrier which receives a seal or label from a magazine or other source of supply and applies same to a package; to provide a sealing or labeling machine, wherein a carrier is advanced in a step by step manner to afford interval of rest to receive a seal or label thereon and to affix or apply same to the package or article to be sealed or labeled; to provide a sealing or labeling machine which is particularly adapted to insure application of a seal or label at each operation of the machine; to provide a sealing or labeling machine occupying less space than previous machines; to provide a machine of this character which is capable of a higher speed and faster application of labels or seals than machines heretofore provided; and in general to provide an improved labeling or sealing machine of simple construction, affording greater certainty of proper operation and adapted to cooperate with a package carrier for applying a label to or sealing a package advanced by the carrier.

Figure 1:
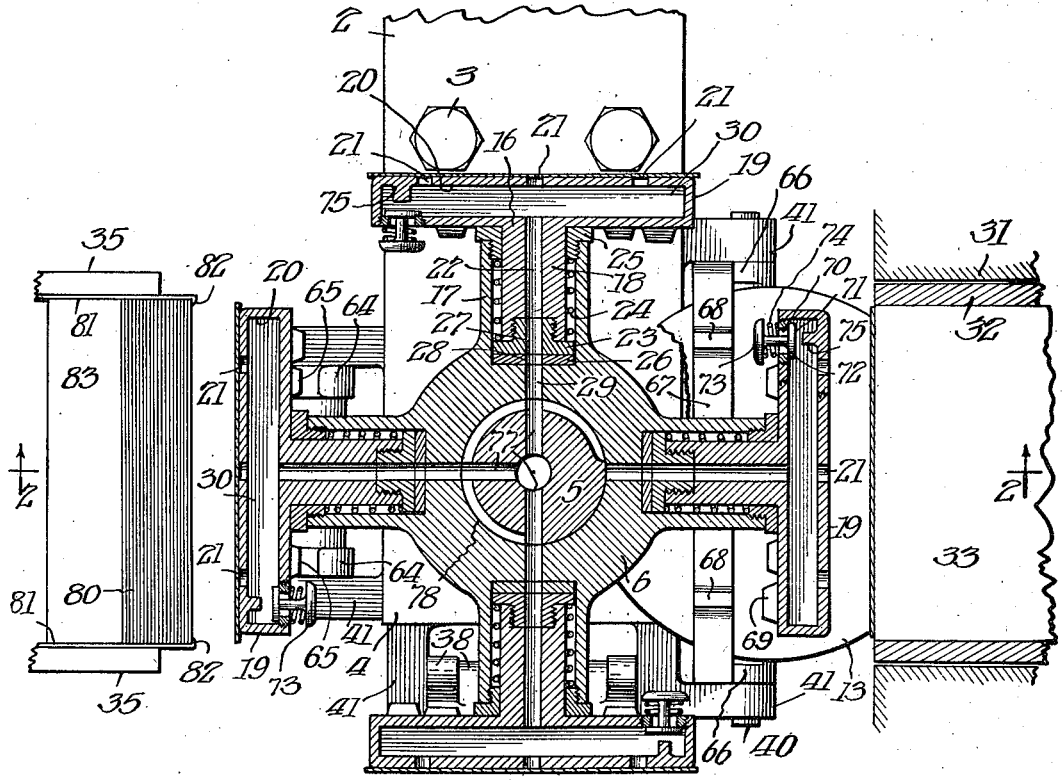
Figure 1:
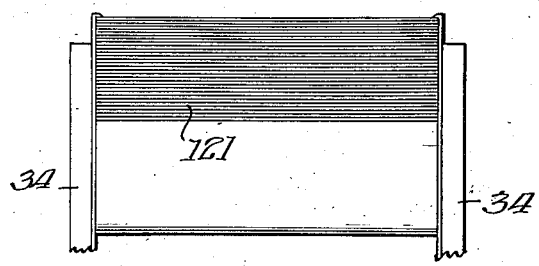

On the drawings, Fig. 1 is a view looking at the top of the machine with the revolving head shown in horizontal section on the line 1—1 of Fig. 2; Fig. 2, a vertical sectional view of the machine taken on the line 2—2 of Fig. 1; Fig. 3, a plan view of the driving gear for the head with parts in section on the line 3—3 of Fig. 2; and Fig. 4, a side view of the paste-applying mechanism and adjacent portions of the label carrier.

As shown on the drawings, the reference numeral 1 indicates a base or floor upon which the mechanism of the device is mounted, and 2, a bracket which is bolted as at 3, or otherwise suitably mounted on the base or floor 1.

This bracket 2 has an off-set seat 4 at the top with the hollow spindle 5 integral therewith and extending up thereabove, and upon which the head or turret of the labeling machine is mounted to rotate. Said head comprises a sleeve 6, which is closed at the upper end and telescopes the spindle 5 and is operated by a Geneva gear drive, so as to be rotated in a step by step manner, a quarter turn at each step, and held stationary for an interval between the successive movements thereof. This Geneva gear drive comprises a four point star wheel 7, on the lower end of the shell 6, having a radial groove 8, at each point; a cam disk 9 mounted on a vertical spindle or stub shaft 10, carried by the bracket 11, which is mounted on the floor or base 1, said cam wheel being adapted to extend, during the major portion of its rotation, between the points of the star wheel 7, to lock the latter against rotation, and having a circumferential notch 12, which is adapted to afford a recess to receive the points of the star wheel as the latter is turned; and also a disk 13 which is secured to or formed integral with the cam disk 9 at the under side thereof, and has a pin 14 projecting upwardly therefrom adjacent the periphery and adapted to engage successively in the notches 8 to rotate the star wheel and head 6, a quarter turn at each revolution of the disk 13. The hollow spindle 5 is cut away at 15 as indicated in Figs. 2 and 3, to permit the edge of the disk 13 to project therein and enable the pin 14 to slide inwardly along each groove 8, the necessary distance as the latter operates to turn the star wheel and head 6.

From the foregoing, it will be observed that the head 6 rotates a quarter turn at each revolution of the disk 13 and cam disk 9, and that there is an interval between each successive quarter turn of the head 6, of sufficient duration to permit operation of the mechanism parts as hereinafter described.

A series of plungers 16, four in number, are mounted in tubular extensions 17, radiating from the upper portion of the head 6, and arranged at 90° intervals around the head, so that as the head is rotated, step by step, each plunger advances to the position just occupied by the preceding plunger, there being four positions of rest for each plunger around the head. These plungers are similarly constructed, each comprising a shank 18, with a flat hollow picker head 19 at the outer end having a face-plate 20 of the proper size to hold a label thereon, said plate being provided with a plurality of perforations 21, for exhausting the air from the back of the label, to hold the same on the face-plate 20. The shank 18 of each plunger has a longitudinal exhaust aperture 22, and exteriorly is of smaller diameter than the radial opening in the tubular extension 17. The inner end of each shank 18 has a flanged cap 23 threaded thereon or otherwise secured thereto and provided with a flange which fits closely, the interior bore of the tubular extension 17, so as to slide therein, and a spring 24, is coiled around the shank 18 inside the tubular extension 17 and bears against this cap so as to hold the plunger 16 normally in the retracted position. A bushing 25 is threaded or otherwise secured to the outer end of the tubular extension 17 and has an internal opening adapted to fit closely against the shank 18, so as to afford a sliding fit and the outer end of the coiled spring 24 bears against this bushing. A gasket 26, is preferably placed at the base of the opening in the tubular extension 17 to provide a cushioning bumper to receive the impact of the plunger 16 as the latter is retracted and also to avoid leakage from the exhaust channels hereafter mentioned when the plunger is in the retracted position. This gasket 26 and cap 23 are centrally apertured as shown in Figs. 1 and 2 at 27 and 28 respectively and the head likewise apertured at 29, in alignment with the opening 22 of the shank 18 so as to afford a continuous exhaust passageway from the chamber 30 of the plunger head 19 to the interior of the head 6.

Adjacent one of the four positions at which each plunger head 19 is held at rest during the step by step rotation of the head 6, is a package carrier 31 which is synchronized so as to advance step by step with the head 6 and provided with holders 32 for retaining packages 33 on the carrier at proper distances apart to come successively to a position to have a label applied by the labeling machine to the end or other portion thereof. This package carrier may be of any suitable construction as its specific construction forms no part of our present invention, it being only necessary that it should be properly located adjacent to the labeling machine, so that the latter may apply a label thereto, and that it be operated properly to advance packages successively at the proper time to be acted upon by the labeling machine.

At the next succeeding position, a quarter turn distant from the position at which the label is applied to the package, is a magazine 34 for the labels, and at the next succeeding quarter turn position is an auxiliary label magazine 35, which is adapted to supply a label to the labeling machine in case a label fails to feed from the magazine 34 or is dislodged from the face-plate 20 before the plunger head 19 reaches the position opposite the magazine 35.

At the next quarter turn position from the magazine 35 is a paste-applying mechanism indicated generally at 36 in Fig. 4, which is adapted to apply paste to the label on the plunger head 19, at the quarter turn position preceding the position in which the label is applied to the package.

For the purpose of withdrawing labels from the magazines 34 and 35 and also for the purpose of affixing the label to the package, mechanism is provided which, when the head 6 is held stationary, projects the three plunger heads 19 which are positioned adjacent the package and the two magazines respectively, outwardly so as to affix the label on the package and withdraw a label from the main magazine 34, and also withdraw a label from the auxiliary magazine 35, in case a label is not already on the adjacent plunger head. The mechanism comprises three oscillatable members 37, 38 and 39, which are alike, excepting as hereinafter noted, each being journaled on a separate shaft 40 carried by bearings 41 on the seat 4 of the bracket 2. Each member 37, 38 and 39 has a pair of arms extending upwardly in proper position so as not to interfere with rotation of the heads 19, and so as to be engaged at times against the backs of the three heads adjacent the package and the two label magazines respectively for forcing the plunger heads outwardly. Each of the members 37, 38 and 39 has an arm 42 extending inwardly under the seat 4 of the bracket 2 and provided with a ball 43 at the inner end engaging in the annular groove 44 of a collar or spool 45. This collar or spool has a stem extending upwardly therefrom and fitted to slide vertically in a socket 47 on the under side of the seat 4 of the bracket 2, said socket being in axial alignment with the spindle 5 above the seat 4, and having a vent opening 48 at the upper end to prevent pocketing of air in the socket.

At one side of the labeling machine, there is a drive shaft 49, which is journaled in any suitable manner to rotate and preferably connected to operate with the label carrier 31 to afford the necessary synchronous operation between the labeling mechanism and the package carrier.

A lever 50 is pivoted intermediate of its ends on a pivot pin 51, extending laterally from the bracket 11 and the inner end of this lever extends under the collar or spool 45 and is pivoted by the pin 53 to a pair of lugs 52, depending from said collar. The perforation 54 at the end of the lever 50 through which the pin 53 passes, is elongated as shown in Fig. 2, to permit the necessary relative movement, of the end of the lever 50, transversely to the axis of the spool or collar 45, as the lever swings on the pivot 51.

A roller 55 is mounted at the end of the lever 50 in position to be engaged by the cam disk 56 on the shaft 49, said disk being provided with an enlargement 57 properly positioned to engage the roller 55 and operate the members 37, 38, and 39, to project the plunger heads of the labeling machine at the interval of rest of said plunger heads.

For holding the inner end of the lever 50 in the lowermost position, a spring 117 has one end connected with the lever 50 and the other end connected with a staple or loop 118 on the floor or base 1, and for limiting the depression of the inner end of said lever, there is a stop lug 119, extending up from the floor or base 1, and engaging under the inner end of the lever.

The Geneva gear drive for a head 6, is connected for operation from the shaft 49, the latter being provided for this purpose with a bevel gear 58, which meshes with the bevel gear 59, secured on the outer end of a stub shaft 60, which shaft is journaled in a bearing 61, on the bracket 11.

Another bevel gear 62 is secured on the inner end of the stub shaft 60 and meshes with a bevel gear 63, which is secured to or formed integral with the Geneva disks 9 and 13, so that the latter rotate with the bevel gear 63, and said bevel gears 58, 59, 62, and 63, being arranged so that the Geneva disks 9 and 13 make one complete revolution with each revolution of the shaft 49.

The members 38 and 39 each have a pair of upstanding arms 64 which are spaced apart and adapted to engage against the rear wall of the plunger heads 19 for projecting the heads outwardly, and the rear wall of each head is preferably formed with impact lugs 65 against which the upper ends of said arms contact.

The member 37 is somewhat differently constructed and comprises a pair of arms 66, suitably spaced, to permit location of the Geneva drive mechanism therebetween said arms being connected together above the Geneva gear 9—13 by a cross bar 67 and having extension arms 68 thereabove, spaced somewhat further apart than the arms 64 of the members 38 and 39, so as to engage at wider spaced points than the arms 64. Each of the plunger heads 19 has a lug 69 at one side of its rear wall positioned so as to be engaged by one of the arms 68, and a valve head 73 at the other side which is engaged by the other arm for opening the valve 71.

This valve is inside the head 19 and normally closes the exhaust port 70 from the chamber 30 of the head 19. A stem extends out through the port 70 and connects the head 73 and valve 71, and has a spring 74 coiled therearound and interposed between the head 73 and the rear wall of the plunger head 19, so as to hold the valve 71 normally in the closed position as shown in Fig. 1. The front wall 20 of each plunger head is preferably provided with a stud or projection 75 on the inner face, which is adapted to arrest the opening movement of the valve 71, when the arms 68 comes in contact with the lug 69.

The heads 19 are adapted to have the air exhausted from the chambers 30 thereof, for the purpose of withdrawing labels from the magazines 34 and 35 and holding the labels on the front walls or face-plates 20 of the plunger heads until they reach the point at which they are affixed to the package, said labels being withdrawn from the magazines and held against the faces of the plunger heads 19, by suction acting on the label through the aperture 21. For exhausting the air from the chambers 30 of the plunger heads, the hollow spindle 5 which is closed at the upper and lower ends to afford a suction chamber 76, therein, has the ports 77 leading outwardly from the upper end of the suction chamber, so as to register with the passageways 29 of the respective plunger heads, when the latter are in a position to receive labels from the magazines 34 and 35 and in a position to have paste applied to the label from the paste-applying mechanism 36, and a groove 78 is provided around the periphery of the spindle 5, and connecting the outer ends of the ports 77, so as to afford communication with the chambers 30 of the plunger heads during the rotation of the head 6, said groove 78 being terminated as shown in Fig. 1, to interrupt communication with each plunger head as it reaches the position in which the label is applied to the package.

Air is continuously exhausted during the operation of the machine, from the chamber 76 through a pipe 120 which is connected with any suitable suction or air exhaust mechanism, the latter not being shown as such devices are well known.

The main label magazine 34 and auxiliary magazine 35 are similar in construction, each consisting of an inclined chute 79 in which the labels 80 are placed upright as shown in Fig. 2, and there are a pair of straps 81 at each side of the magazine, having inturned lips 82 at the lower ends, adapted to engage the outer face of the lowermost label adjacent the side edges thereof, as shown in Fig. 1, to hold the stack of labels in the magazine. At the back of the stack of labels, I provide a weight 83 with the lower edge inclined so as to hold the weight upright when resting upon the inclined bottom 9 of the label magazine, said weight being adapted to slide downwardly along the magazine, to hold the labels in an upright stack against the lips 82 at the lower end of the magazine.

The paste-applying mechanism, indicated as a whole at 36 in Fig. 4 is adjacent the position occupied by the plunger heads 19, just preceding the position at which the labels are applied to the package. The paste receptacle 86 is mounted on a pair of frames or standards 84 and 85 which are secured to the floor or base 1. There is a paste-roll 87 mounted in the paste receptacle 86, which engages and rolls against a paste roll 88, mounted in an elevated position, on extensions 89 of the side walls of the receptacle 86, said rolls being fixed upon shafts 90 and 91 respectively, which extend outside a side wall of the receptacle and are provided with intermeshing gears 92 and 93 respectively, to insure positive relative rotation of said rolls. These rolls are continuously rotated by a gear 94, which is journaled on a stub shaft 95 in mesh with the gear 92, and has power applied thereto by a belt 96 around a pulley 97 which is secured to the gear 94. Power may, of course, be applied to these paste-rolls in any other desired manner.

Pivotally mounted at 98 on the rear standard 85 are a pair of arms 99 which straddle the standard or frame 84 and extend to a point adjacent the paste-applying position of the plunger heads 19. Pivoted at 100, on the outer ends of the arms 99 is a frame comprising two side arms 101 which are connected together to swing as a unit on the pivot 100 by cross brace or connection 102. A shaft 103 is journaled on the side members 101 at their upper ends and has a paste-roll 104 mounted thereon so as to engage the paste-roll 88 to receive a coating of paste and move downwardly with the arms 99 to apply a coating of paste to the label on the label carriers 19. To insure a thorough application of paste to the surface thereof, this roll 104 is positively rotated when engaged with the paste-roll 88 by means of a gear 105 which turns with the roll 104 and in the upper position meshes with the constantly driven gear 93.

It is desirable to bring the paste-roll 104 gradually into contact with the label on the head 10, and also to bring the paste roll into contact with and withdraw same from the label at a short distance from the edges thereof to avoid application of paste at the edges, which would be pressed out from under the label when the latter is applied to the package. For this purpose the track or guide members 106 and 107 are suitably mounted above and below the position occupied by the head 19 when the paste is applied to the label thereon, and these guides are engaged by a roller 121 on the shaft 103 which holds the frame 101 and 102 and paste-roll 104 mounted thereon retracted against the tension of the spring 122. The guides 106 and 107 are arranged at an inclination to the face of the label carrier 19 so that as the arms 99 are moved downwardly the spring 122 gradually forces the roller 104 outwardly as the roller 121 moves along the track 106 and the paste-roll 104 comes easily or gradually into contact with the label on the head 19 at a short distance below the upper edge of the label, and the guide 107 engages the roller 121 and withdraws the roller 104 from engagement with the label 80 at a short distance from the bottom edge thereof.

A stop 123 may be provided, if desired, at the outer end of one or both of the arms 99 to limit the outwardly swinging movement of the frame 101—102 under tension of the spring 122, in case the paste applying mechanism is operated manually or otherwise when a label head 19 is not positioned to hold the roll 104 as it swings between the guides 106 and 107.

At each interval of rest of the turret head 6 the paste-roll 104 is required to be depressed, so as to sweep same along the outer surface of the label on the adjacent plunger head 19. For this purpose, a lever 108 is pivoted at 109 intermediate of its ends on the bracket 11 and has the inner end thereof pivoted to a knuckle 110, and this knuckle is pivoted at 111, to a connecting rod 112, the upper end of which is pivoted at 113 to one of the arms 99, at a short distance from the pivot 98, so that a small degree of movement of the connecting rod 112 affords a larger degree of movement of the paste roll at the free end of the arm 99.

The other end of the lever 108 is provided with a roller 114 which engages under a cam disk 115, on the shaft 49, said cam disk being cut away at 116, so as to release the paste roll from its elevated position at the proper time, and permit same to be depressed by gravity so as to apply a coating of paste to the label on the adjacent plunger head, after which the paste roll is elevated to the original position, while said plunger head remains at the interval of rest.

In the operation of this machine, the package carrier 31 is advanced step by step to correspond with the step by step movement of the labeling or sealing mechanism and the exhaust mechanism operated so as to exhaust the air from the chamber 76.

Each plunger head 19 follows the same cycle of operations and comes to the first position of rest adjacent the main label magazine 34, and in such position, the member 38, located at this point, is operated by the cam 57, and projects the plunger 19 outwardly to a position immediately adjacent the end label of the stack of labels which is indicated at 121.

The chamber 76 being in communication with the chamber 30 in this plunger head, tends to exhaust the air therein and suck in the air through the apertures 21 through the front face of the head, and as the head is projected, this suction draws the lowermost label onto the face of the plunger head, and holds same thereon, the label readily being withdrawn from engagement with the lips 82 as the plunger returns to the normal position and the stack of labels 121 in the main magazine is pressed down by the following weight 83, so that another label is immediately located in the position from which the preceding label has just been withdrawn.

The plunger head is then advanced by the Geneva gearing to the second position adjacent the auxiliary label magazine 35, and in this position projected outwardly by the member 39. The purpose of the auxiliary magazine 35 is to supply a label to the head in case a label has failed to feed onto the head from the magazine 34 or has become dislodged therefrom, as the head moves from the first to the second position. If there is a label on the head 19 at the second position, the apertures 21 of course are closed, and the suction incapable of acting upon the labels in the auxiliary magazine 35, so that the plunger head is merely projected outwardly with a label thereon and returns with the label thereon and does not affect the labels in the auxiliary magazine. If, however, there is no label on the head 19 in the second position, a label will be withdrawn and held on the face of the head in the same manner as has just been described in connection with the label feed from the main magazine 34. This arrangement of the auxiliary label magazine serves to insure supply of a label to the head 19 and avoids the difficulty occasioned in other machines by failure of the label to feed properly onto the head.

In the third position of the plunger head 19, said head is not projected outwardly as in the previous positions, but remains stationary, and while located at this position, the cutaway portion of the cam 115 rides over the roller 114, and permits the latter to be elevated, due to the weight of the paste roll and the paste roll sweeps down over the face of the plunger head, and the label thereon, and applies a coating of paste to the label. The yielding manner in which the paste roll 104 is mounted at the ends of the arms 99, permits the paste roll to be retracted as it engages and moves over the surface of the label, merely maintaining sufficient pressure to properly apply the coating of paste.

The plunger head 19 then is advanced by the Geneva gearing to the final or label-affixing position, in which the label is projected outwardly against the end of the package 33, and affixed thereto. The projection of the plunger head 19 at this position is effected by the member 37, the arms 68 of which are spaced apart a suitable distance to engage the lug 69 and the head 73 of the valve 71 to force the plunger head outwardly and in so doing, opens the valve 71 so as to admit air into the chamber 30 and relieve the suction thereon, so that the label is released from the face-plate of the plunger head and may freely adhere to the package.

It will be observed that as the turret 6 moves the plunger head to the final position, the port 29 passes beyond the groove 78, so that communication from the chamber 30 of the plunger head to the suction chamber 76 is interrupted so that at the time the label is affixed to the package, the exhaust mechanism does not communicate with the chamber 30, and the opening of the valve 71 readily relieves the suction in the chamber 30.

It will be understood, of course, that with the present construction, the members 37, 38 and 39 are operated simultaneously by the cam 57 and that there is a plunger head in each of the four positions, three of which are projected outwardly by members 37, 38 and 39.

It will be further noted that it is only necessary to advance the turret a quarter turn as each succeeding package is brought forward to be operated upon, with the result that a faster operating machine is afforded and the packages can therefore be labeled more rapidly than with machines heretofore provided.

The auxiliary sticker magazine besides insuring the application of a seal in the event of absence of a sticker due from the first magazine, also prevents clogging of the picker mechanism with paste, and assists in preserving the required vacuum pressure.

While we have shown and described our invention, in a certain practical form, we are aware that various changes and modifications may be made without departing from the principles of our invention, and we therefore do not purpose limiting the patent granted hereon, otherwise than necessitated by the prior art.

We claim as our invention:

1. In an apparatus of the class described, the combination of a sticker blank magazine and a holder for an article, a sticker blank carrier movable from a position adjacent the magazine to a position adjacent the carrier, and an auxiliary sticker blank magazine adjacent the path of the carrier and intermediate of the first mentioned magazine and the article holder.

2. In an apparatus of the class described, the combination with a sticker blank magazine and a holder for an article, of a carrier adapted to remove a sticker blank from said magazine and transfer same to the article on the carrier, and an auxiliary sticker blank feeding mechanism operable as the carrier moves from the magazine to the article holder to supply sticker blanks to an empty carrier.

3. Sticker applying apparatus comprising a rotary picker mechanism, a plurality of spaced similar sticker magazines and an article support, circumferentially spaced around said picker, and means for intermittently rotating said picker mechanism step by step in amounts corresponding with the spacing of the magazines.

4. In combination a rotary turret provided with a plurality of similar picker heads, a plurality of sticker magazines and an article support, spaced circumferentially around said turret, means for rotating said turret to bring each of said picker heads successively into operative relation with one of the picker magazines, with another picker magazine, and with an article carried by said support.

5. In combination a rotary turret provided with a series of picker heads, a main and auxiliary sticker magazine, an adhesive applying means, and a support for an article, said four last named elements being circumferentially spaced around said turret, means for rotating said turret to bring each of the picker heads successively into operative relation with each of the said four elements, and means for actuating each picker head successively when in operative relation with each of said picker magazines, whereby a sticker will be applied to said picker head from the main magazine, or from the auxiliary magazine, in the event of the absence of a sticker from the picker head when in operative relation with the auxiliary sticker magazine.

6. In combination, a rotary turret provided with a plurality of equi-spaced radially movable picker heads, a pair of sticker magazines circumferentially disposed around said turret and spaced to correspond with the space of the picker heads, means for intermittently rotating said turret to bring the picker heads successively into operative relation with said magazines, and an article to which the stickers are to be applied, and means for moving each of said picker heads radially into engagement with a stock of labels supported by each of said magazines whereby a failure to apply a sticker from the first magazine will be rectified by the application of a label from the second magazine.

7. In combination, a rotary turret provided with a series of equi-spaced picker plungers, said picker plungers being equipped with suction plates, a pair of sticker magazines, an adhesive applying mechanism, and an article holder, said last four elements being circumferentially arranged around said turret at positions corresponding with picker head positions, means for intermittently rotating the turret step by step to bring each of said picker heads successively into operative relation with each of said four elements, and means for effecting relative movement of each picker head with respect to each sticker magazine successively to effect the application to said head of a label from one or the other of said sticker magazines, and for subsequently effecting movement of said picker head relative to the adhesive applying mechanism, and the article on said holder, successively.

8. In combination, a rotary turret provided with a series of equi-spaced picker plungers, said picker plungers being equipped with suction plates, a pair of sticker magazines, an adhesive applying mechanism, and an article holder, said last four elements being circumferentially arranged around said turret at positions corresponding with picker head positions, means for intermittently rotating the turret step by step to bring each of said picker heads successively into operative relation with each of said four elements, and means for effecting relative movement of each picker head with respect to each sticker magazine successively to effect the application to said head of a label from one or the other of said sticker magazines, and for subsequently effecting movement of said picker head relative to the adhesive applying mechanism, and the article on the said holder, successively, comprising a member arranged coaxial with said turret, and individual connections between each of said picker heads and said common member, whereby coaxial movement of said member will effect simultaneous radial movement of said picker heads on the turret.

9. In combination, a rotary turret provided with a series of equi-spaced picker plungers, said picker plungers being equipped with suction plates, a pair of sticker magazines, an adhesive applying mechanism, and an article holder, said last four elements being circumferentially arranged around said turret at positions corresponding with picker head positions, means for intermittently rotating the turret step by step to bring each of said picker heads successively into operative relation with each of said four elements, and means for effecting relative movement of each picker head with respect to each sticker magazine successively to effect the application to said head of a label from one or the other of said sticker magazines, and for subsequently effecting movement of said picker head relative to the adhesive applying mechanism, and the article on said holder, successively, comprising a sleeve arranged coaxial with said turret, and individual bell-crank connections between each of said picker heads and said common member, whereby coaxial movement of said member will effect simultaneous radial movement of said picker heads on the turret.

10. In combination, a rotary turret provided with a series of equi-spaced picker plungers, each of said picker plungers being equipped with a suction plate, a sticker magazine, an adhesive applying mechanism, an article holder, means for intermittently rotating the turret step by step to bring each of the picker heads successively into operative position with respect to the sticker magazine, the adhesive applying mechanism, and an article on the holder, means for exhausting air from the suction plates between step by step movements in the rotation of the turret, and means for effecting a radial reciprocatory movement of all of the picker heads on the turret between step by step movements of the turret.

11. In combination, a rotary turret provided with a series of equi-spaced picker plungers, each of said picker plungers being equipped with a suction plate, a sticker magazine, an adhesive applying mechanism, and an article holder, means for intermittently rotating the turret step by step to bring each of the picker heads successively into operative position with respect to the sticker magazine, the adhesive applying mechanism, and an article on the holder, means for exhausting air from the suction plates between step by step movements in the rotation of the turret, and means for effecting a radial reciprocatory movement of all of the picker heads on the turret between step by step movements of the turret, comprising a slidable member mounted coaxial with the turret axis, means for reciprocating said member, and individual bell-cranks pivotally mounted on the turret, and constituting actuating connections between the said member and the picker heads.

FRANK M. PETERS.
WARREN H. HUNGERFORD.